United States Patent [19]

Kanai

[11] Patent Number: 5,202,513
[45] Date of Patent: Apr. 13, 1993

[54] PROCESS FOR PRODUCING AROMATIC HYDROCARBONS

[75] Inventor: Junichi Kanai, Sodegaura, Japan

[73] Assignee: Research Association for Utilization of Light Oil, Tokyo, Japan

[21] Appl. No.: 840,647

[22] Filed: Feb. 21, 1992

Related U.S. Application Data

[63] Continuation of Ser. No. 643,152, Jan. 18, 1991, abandoned, which is a continuation of Ser. No. 512,559, Apr. 20, 1990, abandoned, which is a continuation of Ser. No. 206,226, Jun. 13, 1988, abandoned.

[30] Foreign Application Priority Data

Jul. 15, 1987 [JP] Japan .................. 62-174845

[51] Int. Cl.$^5$ .............................................. C07C 2/82
[52] U.S. Cl. .................................. 585/407; 585/415; 585/416; 423/326
[58] Field of Search .................. 585/407, 418, 416; 423/326

[56] References Cited

U.S. PATENT DOCUMENTS

| | | | |
|---|---|---|---|
| 3,802,886 | 11/1972 | Argaver et al. | 423/328 T |
| 4,187,283 | 2/1980 | Kokotailo et al. | 423/328 T |
| 4,350,835 | 9/1982 | Chester et al. | 585/415 |
| 4,520,118 | 5/1985 | Gane et al. | 502/61 |
| 4,579,988 | 4/1986 | Kieffer | 502/61 |
| 4,761,511 | 8/1988 | Barlow | 585/415 |

FOREIGN PATENT DOCUMENTS

| | | |
|---|---|---|
| 0107875 | 5/1984 | European Pat. Off. . |
| 0124271 | 11/1984 | European Pat. Off. . |
| 0192289 | 8/1986 | European Pat. Off. . |
| 0230356 | 7/1987 | European Pat. Off. . |
| 0252705 | 1/1988 | European Pat. Off. . |

OTHER PUBLICATIONS

Kentgens et al. Chem. Physics Letters, vol. 176, (3,4) pp. 399–403) (Jan. 1991).
Bayense et al. J.C.S. Chem. Communication 1989, pp. 1292–1293 (1989).

*Primary Examiner*—Asok Pal
*Attorney, Agent, or Firm*—Frishauf, Holtz, Goodman & Woodward

[57] ABSTRACT

A process for producing modified crystalline galloalumino silicate having the ZSM-5 crystal structure, and a process for producing aromatic hydrocarbons by the use of a catalyst containing the above modified crystalline galloalumino silicate are disclosed. The modified crystalline galloalumino silicate having the ZSM-5 type crystal structure is produced contacting with a 0.1-2N aqueous alkali hydroxide, followed by calcining galloalumino silicate having the ZSM-5 type crystal structure as obtained by the hydrothermic reaction, at a temperature of 700° to 1,000° C. The aromatic hydrocarbons are produced by contacting hydrocarbons having 2 to 12 carbon atoms with a catalyst containing the above modified crystalline galloalumino silicate.

10 Claims, No Drawings

PROCESS FOR PRODUCING AROMATIC HYDROCARBONS

This application is a continuation of application Ser. No. 07/643,152 filed Jan. 18, 1991 (abandoned) which is a continuation of application Ser. No. 07/512,559 filed Apr. 20, 1990 (abandoned); which is a continuation of application Ser. No. 07/206,226 filed June 13, 1988 (abandoned).

BACKGROUND OF THE INVENTION

1. Field of the Invention

The present invention relates to a process for production of crystalline galloalumino silicate and a process for production of aromatic hydrocarbons. More particularly, it relates to a process for efficiently producing crystalline galloalumino silicate having excellent catalyst performance, and a process for efficiently producing aromatic hydrocarbons by the use of the above crystalline galloalumino silicate as a catalyst.

2. Description of Related Art

In production of aromatic hydrocarbons from various hydrocarbon materials, various zeolites have been used as the catalyst. For example, a method in which crystalline galloalumino silicate modified with steam is used as the catalyst in producing aromatic hydrocarbons from a hydrocarbon material having 2 to 12 carbon atoms(PCT Japanese Application Laid-Open No. 501357/1985), a method in which cryalline gallium silicate wherein $SiO_2/Ga_2O_3 = 25$ to 100 (molar ratio), $Y_2O_3/Ga_2O_3 < 1$ (molar ratio)(wherein Y is Al, Fe, Co or Cr) is used as the catalyst in producing aromatic hydrocarbons from an aliphatic hydrocarbon mixture containing paraffins having 2 to 4 carbon atoms in a proportion of more than 50% (Japanese Patent Application Laid-Open No. 98020/1984), and a method in which crystalline gallium silicate wherein $SiO_2/Ga_2O_3 = 25$ to 250 (molar ratio), $Y_2O_3/Ga_2O_3 < 1$ (molar ratio)(wherein Y is Al, Fe, Co or Cr) and which has been subjected once or several times to a two stage treatment comprising the first stage wherein 0.1 to 5% by weight of cokes is deposited and the second stage wherein the gallium silicate is contacted with an oxygen containing gas at a temperature of 350° to 700° C., or alternatively has been calcined for 2 to 8 hours at a temperature of 600° to 1,000° C. before the above two stage treatment is used as the catalyst in producing aromatic hydrocarbons from an aliphatic hydrocarbon mixture containing paraffins having 2 to 4 carbon atoms in a proportion of more than 50% (Japanese Patent Application Laid-Open No. 98022/1984) are known.

However, the method disclosed in PCT Japanese Laid-Open No. 501357/1985 has disadvantages in that the yield of aromatic hydrocarbons is low and the catalytic life is short. The method disclosed in Japanese Patent Application Laid-Open No. 98020/1984 also has a disadvantage in that the catalytic life is short. The method disclosed in Japanese Patent Application Laid-Open No. 98022/1984 has disadvantages in that a plurality of steps are needed in the preparation of the catalyst and thus the process of preparation of the catalyst becomes complicated and, furthermore, the yield of aromatic hydrocarbons is low and the catalytic life is still insufficiently short.

SUMMARY OF THE INVENTION

The present invention is intended to overcome the problems in the above prior art, and an object of the present invention is to provide a process for producing aromatic hydrocarbons from various hydrocarbon feeds in a high yield over a long time and a catalyst suitable for use in the process.

It has been found that the object is attained by using a catalyst prepared by modifying crystalline galloalumino silicate having a ZSM-5 type (MFI type) crystal structure through calcination at elevated temperatures, or by modifying through calcination after treatment with an aqueous alkali hydroxide solution.

The present invention provides a process for producing modified crystalline galloalumino silicate having a ZSM-5 type crystal structure which comprises calcining galloalumino silicate having the ZSM-5 type crystal structure at a temperature of 700° to 1,000° C., said galloalumino silicate being obtained by a hydrothermal reaction. This is hereinafter referred to as "Process I".

The present invention provides a process for producing modified crystalline galloalumino silicate having the ZSM-5 type crystal structure which comprises treating galloalumino silicate having the ZSM-5 type crystal structure with an aqueous alkali hydroxide solution, said galloalumino silicate being obtained by a hydrothermal reaction, and then calcining the treated galloalumino silicate at a temperature of 700° to 1,000° C. This is hereinafter referred to as "Process II".

The present invention provides a process for producing aromatic hydrocarbons which comprises contacting hydrocarbons having 2 to 12 carbon atoms with a catalyst containing the modified crystalline galloalumino silicate as obtained by the above Process I or II. This is hereinafter referred to as "Process III".

DESCRIPTION OF PREFERRED EMBODIMENTS

Crystalline galloalumino silicate having the ZSM5 type crystal structure to be used as the starting material in Processes I and II of the present invention is preferably such that $SiO_2/Al_2O_3 \geq 12$ (molar ratio), and $Ga_2O_3/Al_2O_3 = 0.0001$ to 2 (molar ratio).

The above crystalline galloalumino silicate may or may not contain organic compounds. Organic compounds contained in the crystalline galloalumino silicate usually result from a crystallization agent used in the preparation of the crystalline galloalumino silicate.

The crystalline galloalumino silicate to be used as the starting material in Processes I and II of the present invention can be obtained by mixing an aqueous solution of each component source and a suitable crystallization agent and then subjecting the resulting mixture to a hydrothermal reaction at a predetermined temperature and under a predetermined pressure.

Component sources include a silicon source (silica source), an aluminum source (alumina source), a gallium source, and other metal sources (e.g., an alkali metal source, an alkaline earth metal source and the like).

Various compounds can be used as the silicon source. Examples of the silicon source are silica powder, silicic acid, colloidal silica, dissolved silica and the like. This dissolved silica includes water glass silicic acid containing 1 to 5 mol of silicon oxide per mol of sodium oxide or potassium oxide, alkali metal silicic acid salts and the like.

Various compounds can be used as the aluminum source. Examples of the aluminum source are aluminum sulfate, sodium aluminate, colloidal alumina, alumina and the like.

Various compounds can be used as the gallium source. Examples of the gallium source are gallium nitrate, gallium oxide and like.

As the alkali or alkaline earth metal source, compounds such as sodium chloride, potassium chloride, calcium chloride, magnesium chloride and the like can be used. When the above dissolved silica is used, it also acts as the silicon source, and when sodium aluminate and the like are used, they also act as the aluminum source.

In addition, if necessary, chlorides, oxides, hydroxides, carbonates, nitrates, sulfates and the like of rare earth metals and Group VIII metals of the Periodic Table can be added.

The crystallization agent to be used in combination with the above component sources is not critical, and crystallization agents commonly used in the preparation of ZSM-5 type zeolite can be used. That is, various organic compounds or ammonia can be used. Examples of the organic compounds are quaternary alkylammonium salts such as tetramethylammonium bromide, tetraethylammonium bromide, monoethyltrimethylammonium bromide, tetra-n-propylammonium bromide, tetra-i-propylammonium bromide, tetrabutylammonium bromide, monobenzyltriethylammonium bromide and the like, primary alkylamines, secondary alkylamines, tertiary alkylamines, alcoholamines such as choline and the like, alcohols, ethers, amides and the like. Of these compounds, quaternary alkylammonium salts are particularly preferred.

The crystalline galloalumino silicate having the ZSM-5 type crystal structure is obtained by adding the above each component source and crystallization agent to water or an aqueous medium containing water as the major component, and subjecting the resulting aqueous mixture to a hydrothermal reaction. Conditions for the hydrothermal reaction are not critical; that is, it suffices that the aqueous mixture is heated under temperature, pressure and period conditions necessary for forming zeolite having the ZSM-5 type crystal structure. The reaction system is usually under stirring, and the atmosphere may be replaced with an inert gas, if necessary. The pH is preferably adjusted to neutral to alkaline.

The thus obtained crystalline galloalumino silicate having the ZSM-5 type crystal structure contains organic compounds used as the crystallization agent in the hydrothermal reaction.

In Process I of the present invention, the crystalline galloalumino silicate thus obtained is, as such, i.e., in the state that the organic compounds are contained, or after preliminary calcination at low temperatures, i.e., in the state that the organic compounds are removed, calcined at a temperature of 700° to 1,000° C., preferably 740° to 850° C. to obtain the desired modified crystalline galloalumino silicate. This modification is usually carried out in an atmosphere of dried air, hydrogen gas or inert gas such as nitrogen gas. It is most preferred that the modification be carried out in dried air. If the heating temperature is less than 700° C., the modification is completed only insufficiently and, therefore, when the resulting crystalline galloalumino silicate is used as a catalyst for the production of aromatic hydrocarbons from various hydrocarbon feeds, the performance and service life of the catalyst are not almost improved over the catalyst prior to the modification. On the other hand, if the heating temperature is more than 1,000° C., the crystal structure is broken and the catalytic activity is lost.

In accordance with Process II of the present invention, the galloalumino silicate having the ZSM-5 type crystal structure as obtained by the above hydrothermal reaction, preferably containing organic compounds is first treated with an aqueous alkali hydroxide solution and thereafter, as such or after preliminary low temperature calcination, is subjected to calcination treatment (modification treatment) at a temperature of 700° to 1,000° C. In the alkali hydroxide treatment, it suffices that the above galloalumino silicate be contacted with a 0.1 to 10 N, preferably 0.5 to 2 N aqueous solution of potassium hydroxide, sodium hydroxide, calcium hydroxide, barium hydroxide or the like at a temperature of 0° to 100° C. for 30 minutes to 3 days. This alkali hydroxide treatment further increases the catalytic performance and service life of the finally obtained modified crystalline galloalumino silicate.

In Process II of the present invention, after the alkali hydroxide treatment, the galloalumino silicate is calcined at a temperature of 700° to 1,000° C. Conditions for this calcination are the same as in Process I of the present invention.

The crystal structure of the modified crystalline galloalumino silicate obtained by Process I or II of the present invention is basically the same as that of the galloalumino silicate used as the starting material, and is the ZSM-5 type.

The crystalline galloalumino silicate has the oxide formulation that $SiO_2/Al_2O_3 \geq 12$ (molar ratio) and $Ga_2O_3/Al_2O_3 = 0.0001$ to 2 (molar ratio), and more specifically can be represented by the following formula:

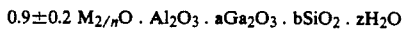

$$0.9 \pm 0.2\ M_{2/n}O \cdot Al_2O_3 \cdot aGa_2O_3 \cdot bSiO_2 \cdot zH_2O$$

(wherein M is an alkali metal (e.g., sodium, potassium and the like), an alkaline earth metal (e.g., magnesium, barium and the like), a rare earth metal (e.g., lanthanum, cerium and the like), Group VIII metal (e.g., platinum, iron, cobalt, nickel and like), or a mixture thereof, or hydrogen; n is the valence of M; a is 0.0001 to 2, preferably 0.1 to 1.0; b is at least 12 and preferably 30 to 300; and z is 0 to 40).

In the process for production of aromatic hydrocarbons (Process III) of the present invention, a catalyst containing the above modified crystalline galloalumino silicate as the major component is used. The galloalumino silicate is mixed with a binder such as clay, chemical treated clay, or an inorganic oxide (e.g., silica, silica-alumina, alumina and the like) in such a manner that the galloalumino silicate is 1 to 95% by weight, preferably 10 to 70% by weight.

In Process III of the present invention, hydrocarbons having 2 to 12 carbon atoms are used as the feed. Examples are one or mixtures of two or more of paraffin hydrocarbons, olefin hydrocarbons, acetylene hydrocarbons, cyclic paraffin hydrocarbons, and cyclic olefin hydrocarbons, containing hydrocarbons having 2 to 12 carbon atoms as the major component. More specifically, ethane, propane, a butane-butylene fraction (BB fraction), ethylene, propylene, a naphtha fraction and the like can be used.

In Process III of the present invention, the above hydrocarbon is used as the feed, and the aforementioned modified crystalline galloalumino silicate is used as the catalyst. Other conditions are not critical. In general, however, the reaction temperature is 200° to 800° C., preferably 400° to 650° C., and the reaction pressure is 0 to 30 kg/cm$^2$, preferably 0 to 10 kg/cm$^2$. Although the reaction may be carried out batchwise, it is preferably carried out continuously. Although the reaction may be carried out in a liquid phase, it is preferably carried out in a gas phase. The state of the catalyst in the reaction system may be any of a fixed bed, a moving bed and a flow bed. In the case of the continuous reaction system, the amount of the catalyst used is usually such that the weight hourly space velocity (WHSV) is 0.1 to 100 hr$^{-1}$ and preferably 1 to 10 hr$^{-1}$ In the reaction system, a hydrogen gas or an inert gas (e.g., nitrogen gas and the like) can be introduced.

The modified crystalline galloalumino silicate as obtained by Processes I or II of the present invention is superior in catalytic performance and service life to the conventional crystalline aluminosilicate or crystalline galloalumino silicate, and further can be obtained by a simplified method. Thus the modified crystalline galloalumino silicate is expected to be used as a catalyst for production of aromatic hydrocarbons, or a catalyst for other reactions, or an a absorbent. In accordance with Process III of the present invention, using the above modified crystalline galloalumino silicate as a catalyst, aromatic hydrocarbons can be produced from various hydrocarbons having 2 to 12 carbon atoms in a high yield over a long time.

Accordingly, Process III of the present invention is effective in production of fuel oils or chemical such as benzene, toluene, xylene and the like.

The present invention is described in greater detail with reference to the following examples.

REFERENCE EXAMPLE 1

(Preparation of Crystalline Galloalumino Silicate)

7.6 g of aluminum sulfate, 6.9 g of gallium nitrate, 15.0 g of 97% sulfuric acid, and 26.4 g of tetrapropylammonium bromide were dissolved in 250 milliliter (ml) of water to obtain Solution (A). Independently, 214 g of water glass (SiO$_2$:28.4% by weight; Na$_2$O:9.5% by weight) was dissolved in 212 ml of water to obtain Solution (B). Independently, 80 g of sodium chloride was dissolved in 122 ml of water to obtain Solution (C).

The above solutions (A) and (B) were dropped at the same time in small portions to the solution (C). After the completion of dropwise addition, 5N sulfuric acid was added to adjust the pH to 9.5, and the mixture was subjected to a hydrothermal reaction in an autoclave at 170° C. for 20 hours under autogenous pressure (6.5 kg/cm$^2$G). After the reaction mixture was cooled, a precipitated product was separated, washed five times with water, and then dried at 120° C. An X-ray diffraction pattern analysis of the solid product obtained confirmed that the X-ray diffraction pattern was the same as that of ZSM-5 zeolite.

Subsequently, the solid product was calcined in a stream of air at 540° C. for 3 hours, was subjected to an ion exchange treatment using a 1 N ammonium nitrate solution at 80° C. for 2 hours, was washed with water and then dried at 120° C. Then, the above calcination, ion exchange treatment and drying process was repeated to obtain crystalline galloalumino silicate. An analysis of the crystalline galloalumino silicate showed that the composition (as oxides) was SiO$_2$:Al$_2$O$_3$:Ga$_2$O$_3$ = 80:1:0.7(molar ratio).

EXAMPLE 1

(1) Modification of Crystalline Galloalumino Silicate

The crystalline galloalumino silicate obtained in Reference Example 1 was calcined in a stream of dried air at 700° C. for 3 hours to obtain a modified crystalline galloalumino silicate.

(2) Production of Aromatic Hydrocarbons

A light naphtha feed having the composition shown in Table 1 was contacted with the modified crystalline galloalumino silicate obtained in (1) of Example 1 in an isothermal reactor under conditions of temperature 500° C., WHSV (weight hourly space velocity) 2.0 hr$^{-1}$, pressure 1 atmospheric pressure. In this reaction, the time for which the yield of aromatic hydrocarbons could be maintained at more than 60% by weight was measured. The results are shown in Table 2.

TABLE 1

| Components | (wt %) |
| --- | --- |
| Isopentane | 20.2 |
| Normal pentane | 30.5 |
| 2,2-Dimethylbutane | 0.5 |
| 2-Methylpentane | 15.1 |
| 3-Methylpentane | 7.9 |
| Normal hexane | 19.5 |
| Methylcyclopentane | 3.3 |

EXAMPLE 2

(1) Modification of Crystalline Galloalumino Silicate

A modified crystalline galloalumino silicate was obtained in the same manner as in (1) of Example 1 except that the calcination temperature was changed to 740° C.

(2) Production of Aromatic Hydrocarbons

The reaction was carried out in the same manner as in (2) of Example 1 except that the modified crystalline galloalumino silicate obtained in (1) of Example 2 was used as the catalyst. The time for which the yield of aromatic hydrocarbons could be maintained at more than 60% by weight was measured. The results are shown in Table 2.

EXAMPLE 3

(1) Modification of Crystalline Galloalumino Silicate

A modified crystalline galloalumino silicate was obtained in the same manner as in (1) of Example 1 except that the calcination temperature was changed to 780° C.

(2) Production of Aromatic Hydrocarbons

The reaction was carried out in the same manner as in (2) of Example 1 except that the modified crystalline galloalumino silicate obtained in (1) of Example 3 was used as the catalyst. The time for which the yield of aromatic hydrocarbons could be maintained at more than 60% by weight was measured. The results are shown in Table 2.

EXAMPLE 4

(1) Modification of Crystalline Galloalumino Silicate

A modified crystalline galloalumino silicate was obtained in the same manner as in (1) of Example 1 except that the calcination temperature was changed to 820° C.

(2) Production of Aromatic Hydrocarbons

The reaction was carried out in the same manner as in (2) of Example 1 except that the modified crystalline galloalumino silicate obtained in (1) of Example 4 was used as the catalyst. The time for which the yield of aromatic hydrocarbons could be maintained at more than 60% by weight was measured. The results are shown in Table 2.

COMPARATIVE EXAMPLE 1

(1) Modification of Crystalline Galloalumino Silicate

A modified crystalline galloalumino silicate was obtained in the same manner as in (1) of Example 1 except that the calcination temperature was changed to 600° C.

(2) Production of Aromatic Hydrocarbons

The reaction was carried out in the same manner as in (2) of Example 1 except that the modified crystalline galloalumino silicate obtained in (1) of Comparative Example 1 was used as the catalyst. The time for which the yield of aromatic hydrocarbons could be maintained at more than 60% by weight was measured. The results are shown in Table 2.

COMPARATIVE EXAMPLE 2

(1) Modification of Crystalline Galloalumino Silicate

A modified crystalline galloalumino silicate was obtained in the same manner as in (1) of Example 1 except that the calcination temperature was changed to 660° C.

(2) Production of Aromatic Hydrocarbons

The reaction was carried out in the same manner as in (2) of Example 1 except that the modified crystalline galloalumino silicate obtained in (1) of Comparative Example 2 was used as the catalyst. The time for which the yield of aromatic hydrocarbons could be maintained at more than 60% by weight was measured. The results are shown in Table 2.

COMPARATIVE EXAMPLE 3

(1) Modification of Crystalline Galloalumino Silicate

The crystalline galloalumino silicate obtained in Reference Example 1 was calcined in an air containing 20% of steam at 500° C. for 1 hour (steam treatment) and then further calcined in a stream of dried air at 540 ° C. for 3 hours to obtain a modified crystalline galloalumino silicate.

(2) Production of Aromatic Hydrocarbons

The reaction was carried out in the same manner as in (2) of Example 1 except that the modified crystalline galloalumino silicate obtained in (1) of Comparative Example 3 was used as the catalyst. The time for which the yield of aromatic hydrocarbons could be maintained at more than 60% by weight was measured. The results are shown in Table 2.

COMPARATIVE EXAMPLE 4

(1) Modification of Crystalline Galloalumino Silicate

A modified crystalline galloalumino silicate was obtained in the same manner as in (1) of Comparative Example 3 except that the steam treatment was carried out for 2 hours.

(2) Production of Aromatic Hydrocarbons

The reaction was carried out in the same manner as in (2) of Example 1 except that the modified crystalline galloalumino silicate obtained in (1) of Comparative Example 4 was used as the catalyst. The time for which the yield of aromatic hydrocarbons could be maintained at more than 60% by weight was measured. The results are shown in Table 2.

COMPARATIVE EXAMPLE 5

(1) Modification of Crystalline Galloalumino Silicate

A modified crystalline galloalumino silicate was obtained in the same manner as in (1) of Comparative Example 3 except that the steam treatment was carried out for 3 hours.

(2) Production of Aromatic Hydrocarbons

The reaction was carried out in the same manner as in (2) of Example 1 except that the modified crystalline galloalumino silicate obtained in (1) of Comparative Example 5 was used as the catalyst. The time for which the yield of aromatic hydrocarbons could be maintained at more than 60% by weight was measured. The results are shown in Table 2.

TABLE 2

| Run No. | Calcination Temperature (°C.) | Time For Which Yield of Aromatic Hydrocarbons Could Be Maintained at More Than 60 wt % (hours) |
| --- | --- | --- |
| Example 1 | 700 | 35 |
| Example 2 | 740 | 51 |
| Example 3 | 780 | 57 |
| Example 4 | 820 | 55 |
| Comparative Example 1 | 600 | 2 |
| Comparative Example 2 | 660 | 6 |
| Comparative Example 3*1 | 540 | 25 |
| Comparative Example 4*2 | 540 | 28 |
| Comparative Example 5*3 | 540 | 15 |

*1 Steam treatment for 1 hour before calcination
*2 Steam treatment for 2 hours before calcination
*3 Steam treatment for 3 hours before calcination

COMPARATIVE EXAMPLE 6

(1) Modification of Crystalline Galloalumino Silicate

At the first stage, the modified crystalline galloalumino silicate obtained in (1) of Example 3 was contacted with n-butane for 30 minutes for conditions of temperature 600° C., pressure 1.5 Barr, WHSV 8 $hr^{-1}$ to deposit about 1% by weight of cokes on the modified crystalline galloalumino silicate. Then, at the second stage, the deposited cokes was removed by contacting the galloalumino silicate with dried air for 1 hour under conditions temperature 500° C., pressure 1.5 Barr to obtain a modified crystalline galloalumino silicate.

(2) Production of Aromatic Hydrocarbons

The reaction was carried out in the same manner as in (2) of Example 1 except that the modified crystalline galloalumino silicate obtained in (1) of Comparative Example 6 was used as the catalyst. The time for which the yield of aromatic hydrocarbons could be maintained at more than 60% by weight was measured. The retention time was 28 hours, which was less than a half of 57 hours of Example 3.

REFERENCE EXAMPLE 2

(Preparation of Crystalline Alumino Silicate)

A crystalline alumino silicate was prepared in the same manner as in Reference Example 1 except that the solution (A) was prepared by dissolving 7.6 g of aluminum sulfate, 17.6 g of sulfuric acid and 26.4 g of tetrapropylammonium bromide in 250 ml of water. An X-ray diffraction pattern analysis of the crystalline alumino silicate confirmed that the X-ray diffraction pattern was the same as that of ZSM-5 zeolite. An analysis showed that the composition (as oxides) was $SiO_2$:$Al_2O_3$=80:1 (molar ratio).

COMPARATIVE EXAMPLE 7

(1) Modification of Crystalline Alumino Silicate

The crystalline alumino silicate obtained in Reference Example 2 was calcined in a stream of dried air at 600° C. for 3 hours to obtain a modified crystalline alumino silicate.

(2) Production of Aromatic Hydrocarbons

The reaction was carried out in the same manner as in (2) of Example 1 except that the modified crystalline alumino silicate obtained in (1) of Comparative Example 7 was used as the catalyst. The yield of aromatic hydrocarbons after one hour from the start of the reaction was 29% by weight.

COMPARATIVE EXAMPLE 8

(1) Modification of Crystalline Alumino Silicate

A modified crystalline alumino silicate was obtained in the same manner as in (1) of Comparative Example 7 except that the calcination temperature was changed to 780° C.

(2) Production of Aromatic Hydrocarbons

The reaction was carried out in the same manner as in (2) of Example 1 except that the modified crystalline galloalumino silicate obtained in (1) of Comparative Example 8 was used as the catalyst. The yield of aromatic hydrocarbons after one hour from the start of the reaction was 30% by weight.

The results show that modification by heating at elevated temperature is not almost effective in gallium-free ZSM-5 type zeolite (crystalline alumino silicate).

REFERENCE EXAMPLE 3

(Preparation of Crystalline Galloalumino Silicate)

7.6 g of aluminum sulfate, 6.9 g of gallium nitrate, 15.0 g of 97% sulfuric acid and 26.4 g of tetrapropylammonium bromide were dissolved in 250 ml of water to obtain Solution (A). Independently, 214g of water glass ($SiO_2$:28.4% by weight; $Na_2O$:9.5% by weight) was dissolved in 212 ml of water to obtain Solution (B). Independently, 80 g of sodium chloride was dissolved in 122 ml of water to obtain Solution (C).

The above solutions (A) and (B) were dropped at the same time in small portions through a dropping funnel to the solution (C) and mixed. After the completion of dropwise addition, 5 N sulfuric acid was added to adjust the pH to 9.5. The mixture was subjected to a hydrothermal reaction in a 1-liter autoclave at 170° C. for 20 hours under autogenous pressure (6.5 kg/cm$^2$G) while stirring at 300 rpm. After the reaction mixture was cooled, a precipitated product was separated, sufficiently washed with an excess of water, and then dried at 120° C. for one day and night. An X-ray diffraction pattern analysis of the solid product (crystalline galloalumino silicate) thus obtained confirmed that the X-ray diffraction pattern was the same as that of ZSM-5 zeolite.

Subsequently, the solid product was mixed with a 1 N aqueous sodium hydroxide solution and stirred at 50° C. for 1 hour on a hot water bath.

Further, the solid product was calcined in a stream of air at 540° C. for 3 hours, was subjected to an ion exchange treatment using a 1 N ammonium nitrate solution at 80° C. for 2 hours, was washed with water, and then was dried at 120° C. Then, the above calcination, ion exchange treatment and drying process were repeated to obtain an alkali treated crystalline galloalumino silicate. An analysis of the alkali treated crystalline galloalumino silicate showed that the composition (as oxides) was $SiO_2$:$Al_2O_3$:$Ga_2O_3$=80:1:0.7 (molar ratio).

EXAMPLE 5

(1) Modification of Alkali Treated Crystalline Galloalumino Silicate

A modified crystalline galloalumino silicate was obtained by calcining the alkali treated crystalline galloalumino silicate obtained in Reference Example 3 in a stream of dried air at 700° C. for 3 hours.

(2) Production of Aromatic Hydrocarbons

Using the modified crystalline galloalumino silicate obtained in (1) of Example 5, a light naphtha having the composition shown in Table 1 was reacted in as isothermic reactor under conditions of temperature 500° C., WHSV 2.0 hr$^{-1}$, pressure 1 atmospheric pressure.

In this reaction, the time for which the yield of aromatic hydrocarbons could be maintained at more than 60% by weight was measured. The results are shown in Table 3.

EXAMPLE 6

(1) Modification of Alkali Treated Crystalline Galloalumino Silicate

A modified crystalline galloalumino silicate was obtained in the same manner as in (1) of Example 5 except that the calcination temperature was changed to 740° C.

(2) Production of Aromatic Hydrocarbons

The reaction was carried out in the same manner as in (2) of Example 5 except that the modified crystalline galloalumino silicate obtained in (1) of Example 6 was used as the catalyst. The time for which the yield of aromatic hydrocarbons could be maintained at more than 60% by weight was measured. The results are shown in Table 3.

EXAMPLE 7

(1) Modification of Alkali Treated Crystalline Galloalumino Silicate

A modified crystalline galloalumino silicate was obtained in the same manner as in (1) of Example 5 except that the calcination temperature was changed to 780° C.

(2) Production of Aromatic Hydrocarbons

The reaction was carried out in the same manner as in (2) of Example 5 except that the modified crystalline galloalumino silicate obtained in (1) of Example 7 was used as the catalyst. The time for which the yield of aromatic hydrocarbons could be maintained at more than 60% by weight was measured. The results are shown in Table 3.

EXAMPLE 8

(1) Modification of Alkali Treated Crystalline Galloalumino Silicate

A modified crystalline galloalumino silicate was obtained in the same manner as in (1) of Example 5 except that the calcination temperature was changed to 820° C.

(2) Production of Aromatic Hydrocarbons

The reaction was carried out in the same manner as in (2) of Example 5 except that the modified crystalline galloalumino silicate obtained in (1) of Example 8 was used as the catalyst. The time for which the yield of aromatic hydrocarbons could be maintained at more than 60% by weight was measured. The results are shown in Table 3.

COMPARATIVE EXAMPLE 9

(1) Modification of Alkali Treated Crystalline Galloalumino Silicate

A modified crystalline galloalumino silicate was obtained in the same manner as in (1) of Example 5 except that the calcination temperature was changed to 600° C.

(2) Production of Aromatic Hydrocarbons

The reaction was carried out in the same manner as in (2) of Example 5 except that the modified crystalline galloalumino silicate obtained in (1) of Example 9 was used as the catalyst. The time for which the yield of aromatic hydrocarbons could be maintained at more than 60% by weight was measured. The results are shown in Table 3.

COMPARATIVE EXAMPLE 10

(1) Modification of Alkali Treated Crystalline Galloalumino Silicate

A modified crystalline galloalumino silicate was obtained in the same manner as in (1) of Example 5 except that the calcination temperature was changed to 660° C.

(2) Production of Aromatic Hydrocarbons

The reaction was carried out in the same manner as in (2) of Example 5 except that the modified crystalline galloalumino silicate obtained in (1) of Example 10 was used as the catalyst. The time for which the yield of aromatic hydrocarbons could be maintained at more than 60% by weight was measured. The results are shown in Table 3.

TABLE 3

| Run No. | Calcination Temperature (°C.) | Time For Which The Yield of Aromatic Hydrocarbons Could Be Maintained at More Than 60 wt % (hours) |
| --- | --- | --- |
| Example 5 | 700 | 46 |
| Example 6 | 740 | 68 |
| Example 7 | 780 | 75 |
| Example 8 | 820 | 73 |
| Comparative Example 9 | 600 | 3 |
| Comparative Example 10 | 660 | 8 |

What is claimed is:

1. A process for producing aromatic hydrocarbons which comprises contacting hydrocarbons having 2 to 12 carbon atoms with a catalyst comprising a crystalline galloalumino silicate having a ZSM-5 type crystal structure which was formed by a hydrothermal reaction, wherein said crystalline galloalumino silicate is prepared with a source of gallium, and then contacted with a 0.1 to 2 N aqueous alkali hydroxide solution, and then modified by calcination at 700° to 1,000° C., to produce aromatic hydrocarbons.

2. The process for producing aromatic hydrocarbons of claim 11 wherein said hydrocarbons having 2 to 12 carbon atoms comprise at least one or mixtures of two or more selected from the group consisting of paraffin hydrocarbons, olefin hydrocarbons, acetylene hydrocarbons, cyclic paraffin hydrocarbons and cyclic olefin hydrocarbons.

3. The process of claim 2, wherein said crystalline galloalumino silicate is calcined at 740° to 850° C.

4. The process of claim 3, wherein said crystalline galloalumino silicate has the molar ratio for $SiO_2/Al_2O_3$ of 12 to 300 and a molar ratio for $Ga_2O_3/Al_2O_3$ of 0.0001 to 2.

5. The process of claim 1, wherein said crystalline galloalumino silicate has the molar ratio for $SiO_2/Al_2O_3$ of 12 to 300 and a molar ratio for $Ga_2O_3/Al_2O_3$ of 0.0001 to 2.

6. The process of claim 5, wherein said aqueous alkali hydroxide solution is an aqueous solution of potassium hydroxide, sodium hydroxide, calcium hydroxide or barium hydroxide.

7. The process of claim 6, wherein the contacting with the aqueous alkali hydroxide solution is carried out at a temperature of 0° to 100° C. for 30 minutes to three days.

8. The process of claim 7, wherein said hydrocarbons having 2 to 12 carbon atoms are selected from the group consisting of ethane, propane, a butane-butylene fraction, ethylene, propylene and a naphtha fraction.

9. The process of claim 8, wherein the contacting of the hydrocarbons having 2 to 12 carbon atoms and the catalyst is carried out at a reaction temperature of 200° to 800° C., a reaction pressure of 0 to 30 kg/cm$^2$ and an amount of catalyst such that a weight hourly space velocity is 0.1 to 100 hour$^{-1}$.

10. The process of claim 9, wherein the reaction temperature is 400° to 650° C., the reaction pressure is 0 to 10 kg/cm$^2$ and the weight hourly space velocity is 1 to 10 hour$^{-1}$.

* * * * *